United States Patent [19]

Gibson et al.

[11] Patent Number: 5,413,488

[45] Date of Patent: May 9, 1995

[54] EDUCATIONAL STRUCTURE

[75] Inventors: Robert S. Gibson, E. Aurora; Reed C. Rankin, Marilla, both of N.Y.

[73] Assignee: Stanford Calvin Corp., E. Aurora, N.Y.

[21] Appl. No.: 128,861

[22] Filed: Sep. 29, 1993

[51] Int. Cl.[6] ............................................. A47B 39/00
[52] U.S. Cl. ...................................... 434/432; 446/432
[58] Field of Search ..................... 434/62, 226, 432; 446/432, 470; 482/35; 108/44

[56] References Cited

U.S. PATENT DOCUMENTS 2,390,479  12/1945  Watson et al. ................. 108/44 X
4,526,548  7/1985  Livingston ....................... 434/226
4,538,995  9/1985  Fryer ............................... 434/432

Primary Examiner—Robert P. Swiatek
Attorney, Agent, or Firm—James J. Ralabate

[57] ABSTRACT

An educational play-on structure that has a number of teaching stations adapted to convey varied educational aspects to children. There is a reading teaching station, a writing teaching station, a study teaching station and a talking or communication teaching station. The structure itself is intended and designed to impress upon children that they can play together and share toys together as they role play at the various teaching stations.

17 Claims, 2 Drawing Sheets

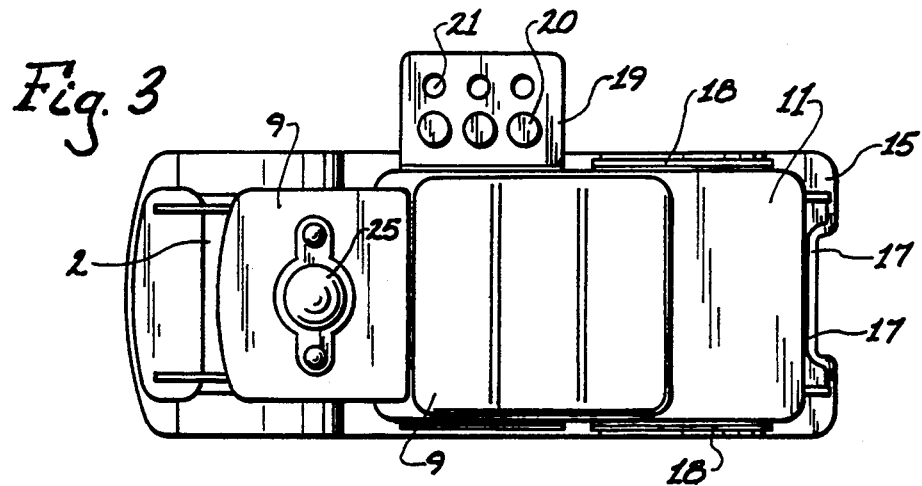
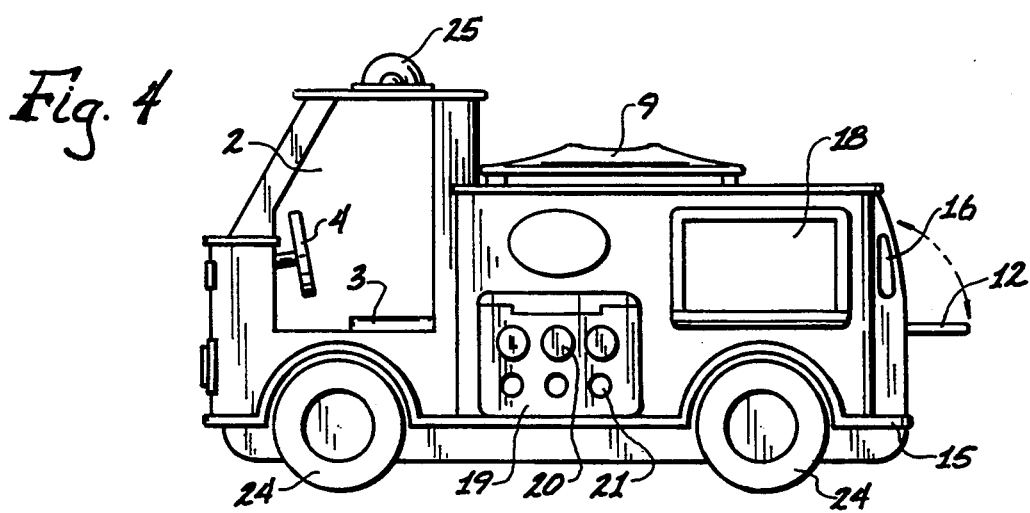
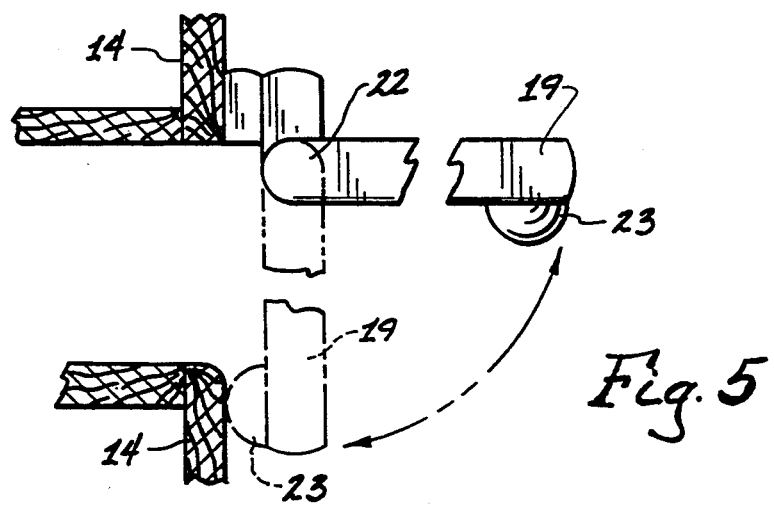

EDUCATIONAL STRUCTURE

BACKGROUND OF THE INVENTION

This invention relates to an educational structure and, more specifically, to a device for teaching children while at the same time providing amusement and entertainment.

It is important when children are in their learning cycles to use whatever means are available to teach them fundamentals. One general problem is that children have such a short attention span that the teaching process cannot be drawn out, tedious or boring. Several educational toys or furniture have been designed especially for children to assist in the training and educational process. The basis of the present invention involves a unit play structure having a plurality of teaching stations. Children can learn several separate concepts while playing together with other children. If a structure retains the child's attention, especially if it is a play unit, the educational process becomes significantly easier.

There have been toys or other structures used to amuse and educate children. Some are disclosed in U.S. Pat. Nos. 3,592,506; 4,057,244; 4,127,948 and U.S. Design Patents Des. 252,718 and Des. 331,610.

In U.S. Pat. No. 3,592,506 (Breslow) a convertible play bench is disclosed which may be used as a chair, table, activity desk or as a toy. This multipurpose structure provides a storage compartment and numerous activity items for children. While this play bench is certainly suitable for its intended purpose, it does not simulate any action structure such as a vehicle, boat or plane. The presence in Breslow of numerous activity items provides a variety of focuses for children to learn while playing. However, Breslow does not provide a substantially stationary structure that several children can play on at the same time in cooperative games and the like.

In Gaspar, U.S. Pat. No. 4,057,244, a child's play seat toy apparatus is disclosed having a play area including an open box member. The box member and seat member of Gaspar are secured to the frame structure for supporting the child while using the play area. There are a plurality of amusement devices secured to an upright wall or backboard to amuse the child using the play seat apparatus. A hinged cover is used as a lid for the box member where toys can be stored. A support seat 26 permits the toy apparatus to be used by only one child who can direct his or her attention to the variety of play items provided. A removable tray is included in the box member and, together with the plurality of amusement devices, allows many hours of play time for the child using the structure. Again, Gaspat's play seat apparatus does provide a series of items to maintain the child's interest but only one child at a time can utilize the apparatus or toy. This toy, for example, would not be appropriate for use in a pediatrician's office or school classroom or playroom where several children may want to utilize it. Also, while several items in Gaspat's device are amusing for children, items having more of an educational purpose would be highly desirable.

In U.S. Pat. No. 4,127,948 (Chin), a play desk in the form of an animated character having a storage area with a hinged lid is described. The play desk has pivotable arm members which simulate the animal's arms and downwardly depending foot members which simulate the animal's feet. Play surfaces 42 and 44 provide the desk area on which the child can work. The desk has a first surface for use as a chalkboard and an opposing surface having grooves and slots for receiving alphanumeric members. While Chin's device provides two different writing surfaces and various pivoting or movable components, it appears more directed toward playing members rather than play-educational members. Also, several children could not utilize Chin's device at one time so that the element of children's cooperation and team playing with other children is missing.

In Design Patents Des. 252,718 (Taylor) and Des. 331,610 (Silber), ornamental designs for simulated vehicles are shown. There are no teaching stations suggested by either and it is apparent that each patent discloses strictly play toys or storage cabinets. The fire truck design of Silber seems to be limited to a seating structure without functioning teaching stations or attention holding items for children.

None of the above-discussed structures teaches the use of a structure having a plurality of dissimilar teaching stations that can be used by several children at the same time and teach children the fun of sharing. Also, the use of structures such as in the present invention used to amuse and teach children by maintaining their attention span over a longer period is not suggested. In addition, no where in the noted prior art is there a teaching of avoiding potentially dangerous structures such as falling lids, gaps allowing fingers to get stuck, non-toxic paint and the like.

SUMMARY OF THE INVENTION

It is therefore an object of this invention to provide a play-educational structure for children that is devoid of the above-noted disadvantages.

Another object of this invention is to provide a play-educational structure devoid of potentially sharp or dangerous components.

A further object of this invention is to provide a play-educational structure that can encourage creativity, imagination and hold a child's attention for an extended period of time while amusing and teaching the child.

Still a further object of this invention is to provide a properly ventilated substantially stationary educational play-on structure that can be utilized by many children at the same time.

A still further object of this invention is to provide an educational play-on structure that includes several teaching stations, each of which is capable of teaching a different concept.

Yet a further object of this invention is to provide an educational play-on structure that simulates an actual structure and which can familiarize the child with actual use and components, Yet still a further object of this invention is to provide a play structure that encourages tidiness and has easily accessible storage areas devoid of hinged, falling lids or other potentially dangerous components.

Another yet further object of this invention is to provide a play education toy that teaches and impresses children to respect property.

Another still further object of this invention is to provide a child size play-educational toy that is not imposing to a child but is rather child-compatible.

These and other objects are accomplished in accordance with this invention by providing a substantially stationary educational play-on structure that has a plurality of teaching stations each directed to a different aspect of child education; i.e. a reading station desk, a writing station blackboard, a visual vehicle station driving cab, etc. In addition, the structure of the present invention teaches children (generally, three years and older) to play together, to cooperate and to share which are personality traits children need to learn and develop. The structure of the present invention is large enough for children to climb into, sit in, climb upon and share with others and this will be referred to hereinafter as "play-on" structure. While the drawings and disclosure will be directed to a vehicle, it should be understood that any play-on structure with a plurality of teaching stations is included within this invention. While the structure of this invention can be made of wood, any suitable material can be used conditioned upon its safety and non-toxicity. Thus, plastic, fiberglass, metal, hardwood, paper products or any other suitable material may be used to construct the structure of this invention. The term "structure" as used in the claims and disclosure of this invention is intended to include any structure (including non-vehicles) that several children can play on and in at the same time. The term "shortened" as it applies to any cords or string connectors such as that on the radio microphone, means at a length that cannot likely harm a child in any way such as fitting tightly around a child's neck, etc. "Lightweight" is intended to include components that prevent entrapment and of a substantially harmless weight if it falls upon or on a child. "Writing and drawing surfaces" encompass blackboards, marker boards, paper surfaces, magnetic boards or any other suitable writing surface for a child to use. The structure is substantially immobile so that children can play on it without the structure easily tipping or moving and possibly injuring other children close by or playing on the structure.

A critical feature of the present invention is to provide a structure simulating an actual item such as a fire truck, a boat, a train engine, a bus, a house, a castle, hospital, school, animal, etc. that has a plurality of teaching stations each conveying a different aspect of learning to the child. The structure, while being educational, is also fun for children and maintains their attention span which is so important when children are to be impressed with a learning point. The structure is large enough for several children to play on at the same time. Thus, it teaches children to share a toy and to cooperate with other children rather than a toy singularly utilized by only one child. The fire engine structure illustrated in the accompanying drawings, for example, provides for places for children to sit in the cab when role playing the driver of the fire engine, places in the back load area or a running board for children to stand, a fold-up panel on a side section of the vehicle to simulate the pump panel with dials as used by firemen, etc. As many varied teaching stations as appropriate can be located in separated sections of the structure; i.e. the interior, the exterior, the sides, the rear etc.

It is also critical to the present invention that if hinges are used, the hinges used such as those on a fold-up or drop-down panel provide at least a ½ inch clearance or gap with any face adjacent the panel. This gap should be present whether the panel is in a folded up position or a dropped down position. This ensures that children cannot catch, crush or injure their finger in any gap between two faces.

The lid that fits over the ventilated storage area lifts off and on over the storage area and is made of a lightweight material such as canvas, cloth, lightweight plastic, cardboard or any other suitable lightweight compositions. Thus, the lid used is lightweight to prevent entrapment, has stand-offs to prevent pinching and provides appropriate ventilation.

BRIEF DESCRIPTION OF THE DRAWING

FIG. 3 is a top plan view of a structure of the invention showing the storage area and location of certain teaching stations.

FIG. 4 is a side view of a structure of the invention showing the location of some teaching stations.

FIG. 5 is an expanded plan view of the safety hinge that may be used in the present invention.

DETAILED DESCRIPTION OF DRAWING AND PREFERRED EMBODIMENT

Figure 1:
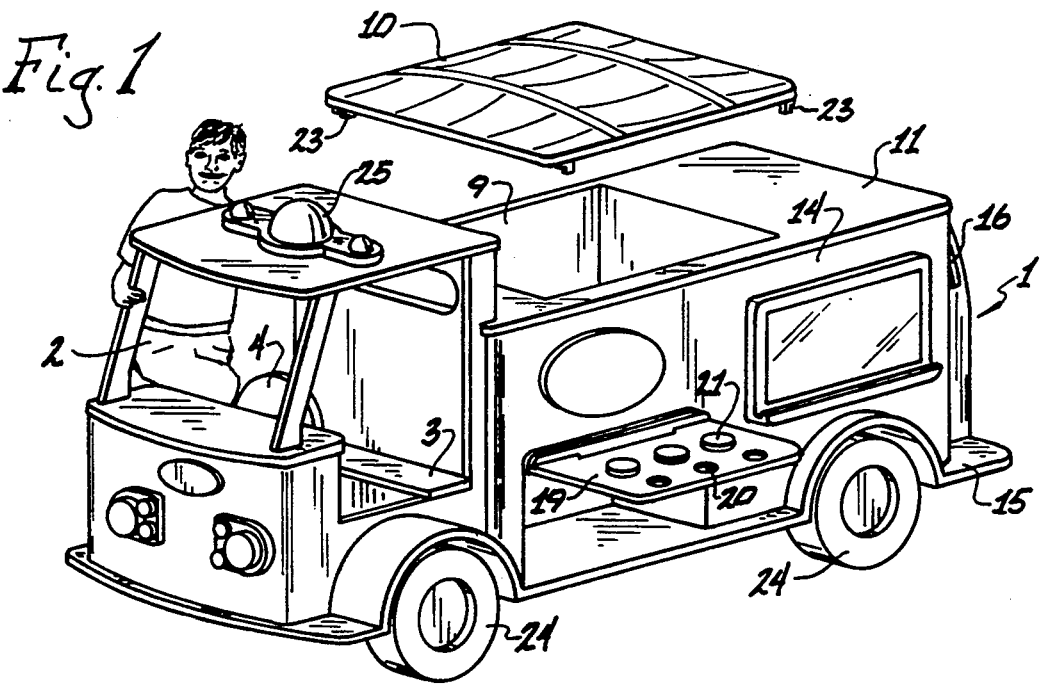
FIG. 1 is a front perspective view of a play-on structure of the present invention showing the storage lid removed and a child adjacent thereto to convey the size of the structure.
Figure 2:
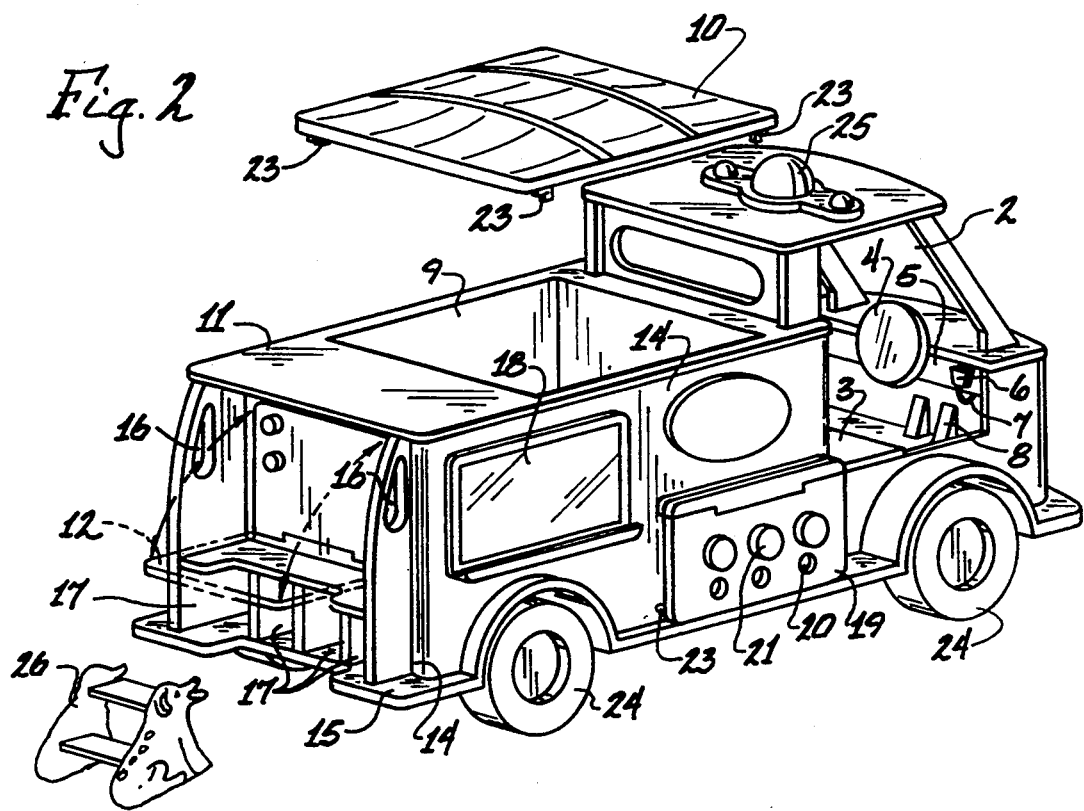
FIG. 2 is a back perspective view of a play-on structure of the present invention showing the storage lid removed.

FIG. 1 illustrates the structure 1 of this invention illustrated by a fire engine play on toy having a cab section 2 (communication station) where children can sit on seat 3 and role-play driving the fire engine 1. Provided in the cab section 2 is a movable steering wheel 4 which will rotate but does not move any other section or part (such as fixed wheels 24) of structure 1. The steering wheel 4 is located in the conventional location of a vehicle cab. Also in the cab section 2 is a dashboard 5 (as seen in FIG. 2) having gauges and could have a radio handset or microphone 6 attached to dashboard 5 by a shortened cord 7. The cord is purposely made short to prevent any possibility that it could reach around a child's neck to injure him or her. The cab communication teaching station 2 provides amusement for the child while at the same time familiarizing the child with the basics of how to communicate with others, how a vehicle is steered, driven and controlled. The beacon 25 is used to teach recognition of emergency vehicles such as fire engines, police cars, ambulances and the like. The radio microphone 6 and dashboard gauges teach the child to use imagination and pretend to read control indicia such as gas gauges and the like. Usually two children can sit in the cab section 2 and can learn team play. On the cab floor of structure 1 can be located foot pedals such as brakes or accelerators 8. As seen in FIGS. 1-4 in the back load or storage area teaching station is located a ventilated toy chest 9 having a lightweight removable lid 10. The toy chest 9 can also be used as a play area or seating area with adjoining surface 11. Also children can stand in toy chest section 9 as do firemen in actual usage. Obviously, toys or other items such as books and the like may be stored in toy chest 9. In the rear section of structure 1 is located a study or reading teaching station including a drop-down desk 12 that can be used as a study, reading, writing or craft work area. Desk 12 folds up and is held magnetically in place as seen in the rear of the truck with stop lights positioned at the outside corners. When desk 12 is in the down position it provides a writing desk surface. Support 15 is a platform for children to stand on while holding on to hand grips 16 as do firemen when an actual fire engine vehicle is moving. Also, a divided shelf 17 provides book shelves or storage for other items. On the side of structure 1 is positioned a writing-drawing surface 18 (writing teaching station) such as a blackboard which could have alphabet listing and the like. At writing teaching station 18, children are taught to write on surfaces similar to those that will be presented to them when they are in school. This teaching area or station 18 can also familiarize children with shape, alphabet and color recognition. Also on the side portion of structure 1 is fold or lift up panel 19 with dials 20 such as pressure dials and attachment aperture means 21 for hoses or the like. FIG. 1 shows panel 19 in its up position and FIG. 2 shows panel 19 in its down position. It is important to this invention that panel 19 be movably connected to side portion 14 by safety hinges 22 that allow at least a ½ inch gap with adjoining surfaces such as surface 14 with panel 19 as shown in FIG. 5. If there are hinged structures used in the present invention, they must have the following features:

(a) There must be a clearance of at least ½ inch by proper mounting of the door or structure;
(b) Hinges used must be made to eliminate pinch points throughout the movement;
(c) An appropriate lid or structure support must be used to prevent the lid or structure from falling and possibly injuring a child. For example, lid supports such as those used in the present invention are available from Carlson Capital Corp. of Rockford, Ill. and identified as part number St. Br. 703 (RorL). Stand off means 23 are provided to ensure appropriate separation from surface 14. Stool 26 can be used, if desirable, with the structure of this invention but is not necessary to the invention.

The preferred and optimally preferred embodiments of the present invention have been described herein and shown in the accompanying drawing to illustrate the underlying principles of the invention, but it is to be understood that numerous modifications and ramifications may be made without departing from the scope of this invention. For example, structures other than vehicles may be used if within the spirit of this invention.

What is claimed is:

1. A substantially stationary educational play-on structure comprising a child size play-educational toy and a plurality of teaching stations and having in combination a main body portion with a storage area section, said main body portion comprising a seating area with seating for at least two children, said storage area section being substantially open and having access means therein, each of said teaching stations having a substantially different structure from the other stations and comprising a reading teaching station, a writing teaching station, a study teaching station and a communication teaching station, said reading teaching station including book storage means, and a plurality of shape and color recognition means, said writing teaching station comprising a writing surface and marking means, said study teaching station comprising a drop-down desk top with a supporting surface for books, and said communication teaching station comprising means for accommodating at least two children, said structure having means to provide play sections for a plurality of children at one time, and at least some of said teaching stations located on the exterior portion of said play-on structure.

2. A substantially stationary educational play-on structure comprising a plurality of teaching stations and having in combination a main body vehicle-like configuration comprising a driving cab as a cab teaching station, a back load section comprising side portions and a back portion, and substantially immovable wheels, said cab teaching station having a seat and a movable steering wheel simulating an actual vehicle-like cab interior, said back load section containing a toy chest and said back load section having access means therein, and having a fold-up panel supported by hinges attached to said back load section, said hinges positioned in a manner to provide at least a one-half inch gap or clearance with adjacent surfaces, and a drop-down desk panel teaching station in a rear portion of said back load section to provide a reading, study and storage area for children.

3. The structure of claim 2 wherein the side portions of said back load section contain at least one writing and drawing surface.

4. The structure of claim 2 wherein said rear portion of said back load section contains shelves for storage of shoes, books, toys or the like.

5. The structure of claim 2 wherein said cab contains a radio microphone attached to a portion of said cab by a shortened cord.

6. The structure of claim 2 wherein said desk panel teaching station comprises a flat upper writing surface in its down position at substantially right angles to vertical partitions positioned below said writing surface.

7. The structure of claim 2 wherein said desk panel teaching station has adjacent to and separated therefrom a combination step stool-desk seat.

8. The structure of claim 2 wherein said fold-up panel and said drop-down desk panel teaching station have rounded corners on all outwardly exposed portions.

9. The structure of claim 2 wherein said structure is finished with a child-safe composition.

10. A substantially stationary educational play-on structure comprising a plurality of teaching stations having in combination a main body vehicle-like configuration comprising a driving cab teaching station, a back load section comprising side portions and a back portion, and substantially immovable wheels, said cab teaching station having a seat and a movable steering wheel simulating an actual vehicle-like cab interior, said back load section containing a toy chest and having access means to teaching stations of said back load section and having a lift up panel supported by hinges attached to the exterior of said play-on structure, said hinges positioned in a manner to provide at least a one-half inch gap or clearance with adjacent surfaces, and a drop down desk panel teaching station in said back portion of said back load section to provide a flat upper writing surface together with reading, study and storage areas for children, said drop down desk panel teaching station having vertical partitions located below and resting on a horizontal surface, said horizontal surface providing a stand-on support when said drop down panel teaching station is in a fold-up position.

11. The structure of claim 10 wherein the side portions of said back load section contain at least one writing and drawing surface.

12. The structure of claim 10 wherein said back portion of said back load section contains shelves for storage of shoes, books, toys or the like.

13. The structure of claim 10 wherein said cab teaching station contains a radio microphone attached to a portion of said cab by a shortened cord.

14. The structure of claim 10 wherein said desk panel teaching station comprises a flat upper writing surface in its down position at substantially right angles to said vertical partitions positioned from said writing surface.

15. The structure of claim 10 wherein said desk panel teaching station has adjacent to and separated therefrom a combination step stool-desk seat.

16. The structure of claim 10 wherein said lift-up panel and said drop-down desk panel teaching station have rounded corners on all outwardly exposed portions.

17. The structure of claim 10 wherein said structure is finished with a child-safe composition.

* * * * *